United States Patent
Mabyalaht et al.

(10) Patent No.: US 12,456,327 B2
(45) Date of Patent: Oct. 28, 2025

(54) METHOD FOR GENERATING A PALM IMAGE BASED ON PARTIAL IMAGES OF A PALM

(71) Applicant: IDEMIA IDENTITY & SECURITY FRANCE, Courbevoie (FR)

(72) Inventors: Guy Mabyalaht, Courbevoie (FR); Laurent Kazdaghli, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 277 days.

(21) Appl. No.: 18/308,973

(22) Filed: Apr. 28, 2023

(65) Prior Publication Data
US 2023/0360428 A1    Nov. 9, 2023

(30) Foreign Application Priority Data
May 3, 2022  (FR) ..................................... 22 04184

(51) Int. Cl.
*G06V 40/12*  (2022.01)
(52) U.S. Cl.
CPC ................. *G06V 40/1335* (2022.01)
(58) Field of Classification Search
CPC .................................................. G06V 40/1335
See application file for complete search history.

(56) References Cited

U.S. PATENT DOCUMENTS

| 2011/0044513 A1* | 2/2011 | McGonagle ....... G06V 40/1365 382/124 |
| 2020/0034996 A1 | 1/2020 | Qian et al. |

FOREIGN PATENT DOCUMENTS

CN   104268542 A   1/2015

OTHER PUBLICATIONS

French Preliminary Search Report & Written Opinion Issued Dec. 5, 2022 in French Application 22 04184 filed on May 3, 2022 (with English Translation of Categories of Cited Documents), 11 pages.

* cited by examiner

*Primary Examiner* — David Perlman
(74) *Attorney, Agent, or Firm* — Oblon, McClelland, Maier & Neustadt, L.L.P.

(57) ABSTRACT

A method for generating an image of a palm based on a first partial image of a palm of the individual and on a second partial image of a palm including detecting first characteristic points in the first image and second characteristic points in the second image, generating a plurality of pairs of characteristic points by matching first characteristic points with second characteristic points, computing an overall geometric transformation associated with said matching, determining a local geometric transformation for each pair of points, and merging the first image with the second image as a function of the overall geometric transformation and of the local geometric transformations, in order to generate the palm image.

11 Claims, 3 Drawing Sheets

METHOD FOR GENERATING A PALM IMAGE BASED ON PARTIAL IMAGES OF A PALM

CROSS-REFERENCE TO RELATED APPLICATION

The present application claims priority to French Patent Application No. 22 04184, filed on May 3, 2022. The entire content of the foregoing is incorporated herein by reference.

The invention relates to the field of biometric imaging, in particular palmprint imaging.

Biometric palmprint acquisition devices are known from the prior art that comprise a contact print acquisition surface allowing an entire palm of an individual to be acquired. These devices are fairly heavy, bulky and not easily transportable. These devices are not suitable for use in the field.

A requirement exists for carrying out contact palmprint acquisitions with a small, transportable device. Such a device allows partial acquisition of palms but not acquisition of an entire palm. The problem that arises then involves reconstructing an entire palm image based on several partial images of the palm.

Image reconstruction methods based on partial images derived from a rolled biometric, for example, of a finger, are known but do not confront the same technical problems, as the partial images are acquired continuously and the reconstruction does not require the identification of pairings of points between partial images.

The methods for reconstructing images based on partial images of fingers, for example, via the use of a telephone sensor, also do not confront the same technical problems, as the partial images are small and do not exhibit significant distortions.

The invention aims to address the aforementioned problems of the prior art by proposing a method for generating an image of a palm of an individual based on partial images of the palm that are not acquired continuously and correcting the distortions.

The invention relates to a method for generating an image of a palm of an individual using a computer, based on a first partial image of a palm of the individual and on a second partial image of a palm of said individual comprising a zone overlapping with said first image, said method comprising:
- a step of detecting first characteristic points of the palm in the first image and second characteristic points of the palm in the second image, for a predetermined type of characteristic points;
- a pairing step generating a plurality of pairs of characteristic points by matching a plurality of first characteristic points with a plurality of second characteristic points in the overlapping zone;
- a step of computing an overall geometric transformation associated with said matching;
- a step of determining a local geometric transformation for each pair of points of the plurality of pairs of characteristic points;
- a step of merging the first image and the second image into a merged image, as a function of the overall geometric transformation and of the local geometric transformations, with the palm image comprising the merged image.

According to one aspect of the invention, the first image and the second image are derived from an acquisition by a contact biometric print acquisition device.

According to one aspect of the invention, the individual has removed their palm from the acquisition surface between the acquisition associated with the first image and the acquisition associated with the second image.

According to one aspect of the invention, the predetermined type is selected from among a list comprising the ORB type descriptor, the SIFT type descriptor, the minutia type descriptor.

According to one aspect of the invention, the generation method further comprises a validating step, in which the matching is validated or invalidated, with the detecting, pairing and validating steps being repeated with another predetermined type of characteristic points if the matching of the previous iteration is invalidated.

According to one aspect of the invention, the predetermined type associated with each iteration is a function of a pre-established order.

According to one aspect of the invention, the matching is validated if the plurality of pairs of characteristic points includes a number of pairs that is greater than a first predetermined threshold and is associated with an induced palm surface that is greater than a second predetermined threshold.

According to one aspect of the invention, the computing step comprises computing an overall linear transformation and an associated overall residual error, with an overall non-linear transformation being computed if the overall residual error is greater than a predetermined threshold error.

According to one aspect of the invention, a local geometric transformation is determined so as to minimize a local residual error for the associated pair of points according to the determining step, with the merging step comprising, for each pair of points, a modification of the pixels of the first image or of the second image in a region of predetermined size comprising said pair of points, as a function of the local geometric transformation associated with said pair of points.

According to one aspect of the invention, pixels belonging to several regions are modified according to an average of the local geometric transformations associated with said regions.

According to one aspect of the invention, a region is centred on the associated pair of points and the predetermined size ranges between thirty and seventy pixels.

According to one aspect of the invention, the computer also has at least one additional partial image of a palm, the method comprising repeating the steps of detecting, pairing, computing, determining and merging, with the merged image from the preceding merging step as the first image, and an additional image comprising another zone overlapping with said merged image as the second image, the method being repeated for each additional image, the palm image comprising the merged image derived from the last iteration.

The invention also relates to a computer program comprising the program instructions implementing the steps of the generation method, when the program instructions are executed by a computer.

The invention also relates to a contact biometric print acquisition device comprising a computer capable of implementing the steps of the method of the invention.

Further features and advantages of the invention will become apparent from reading the description and the drawings.

FIG. 1 illustrates the steps of the method of the invention, able to be implemented by a computer of an acquisition device, based on two partial images of a palm of an individual comprising an overlapping zone, in order to generate an image of the palm of said individual.

A palm of an individual includes a network of ridges and/or grooves on its surface that correspond to a biometric print. A partial palm image includes a portion of said biometric print.

The two partial palm images include a first partial palm image i1 and a second partial palm image i2.

The first partial palm image i1 and the second partial palm image i2 each include a zone Z overlapping with the other partial palm image.

Figure 1:
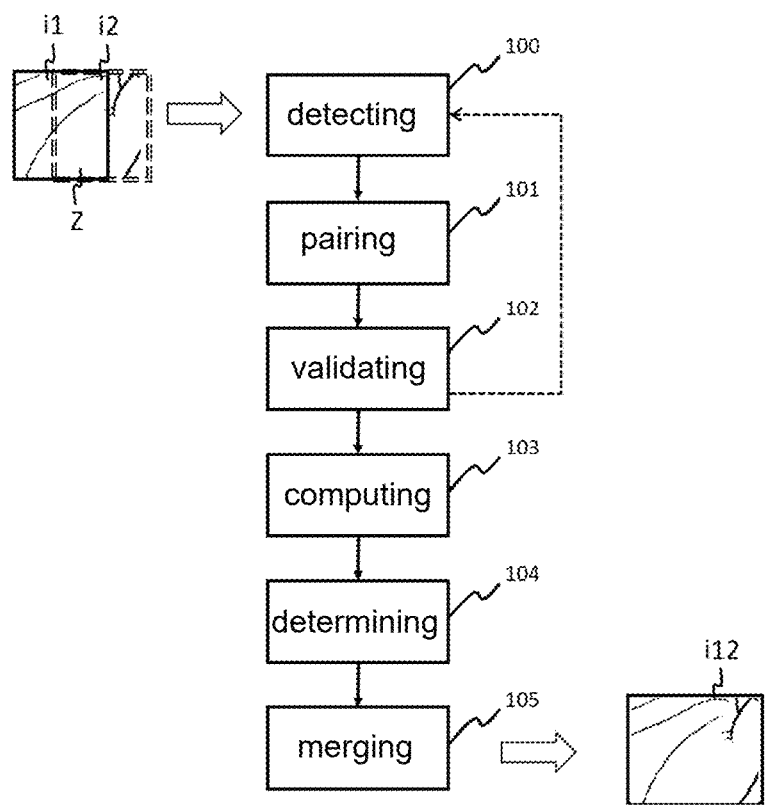
FIG. 1 illustrates the steps of the method according to the invention.

For example, as illustrated in FIG. 1, the first image i1 is an image of the centre of the palm of a right hand of a user. The second image i2 is an image of the thenar eminence of said right hand of the user.

The first image i1 and the second image i2 have a common portion of the palm of the hand that corresponds to the overlapping zone Z.

For example, the overlapping zone Z corresponds to the right half of the first image i1 and the left half of the second image i2.

The method of the invention comprises a detecting step 100, a pairing step 101, optionally a validating step 102, a computing step 103, a determining step 104, a merging step 105.

According to the detecting step 100, the computer detects characteristic points in the two partial palm images including a zone Z overlapping one image and the other image.

Figure 2:
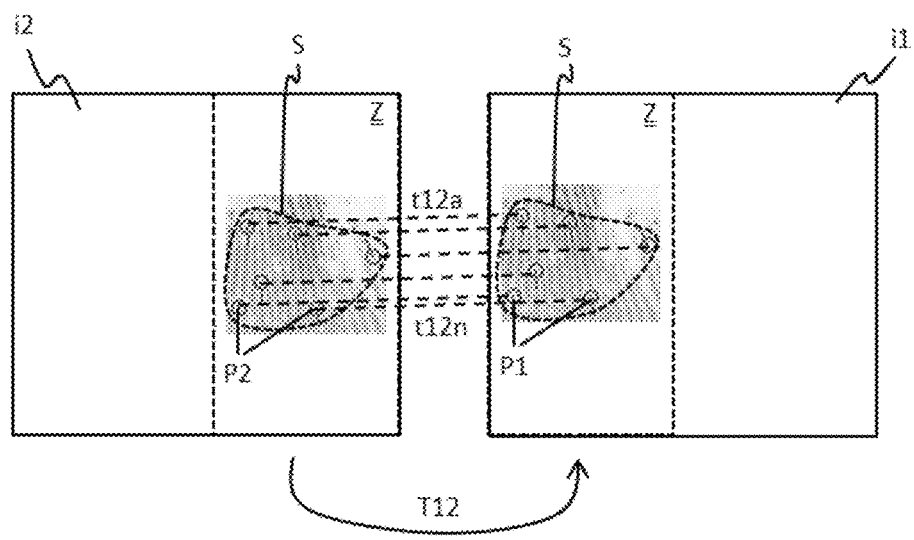
FIG. 2 illustrates two partial images comprising an overlapping zone, in which pairs of characteristic points are identified.

As illustrated in FIG. 2, the detecting step 100 comprises detecting first characteristic points P1 of the palm in the first image i1 and second characteristic points P2 of the palm in the second image i2, for a predetermined type of characteristic points.

The characteristic points are a predetermined type known from the prior art, with the type being selected from among an ORB type descriptor, a SIFT type descriptor, a SURF type descriptor, a minutia type descriptor, a pore type descriptor.

The ORB, SIFT and SURF descriptors are known from the prior art and can be used for processing conventional images.

Minutiae and pore type descriptors are also known from the prior art and are more specific to fingerprint and palm-print image processing.

Other methods, such as those based on neural networks, also allow characteristic points to be detected.

Preferably, the predetermined type is selected, in the following predefined order, from among the ORB type descriptor, the SIFT type descriptor, the minutia type descriptor.

For example, the computer selects the predetermined type of characteristic points that is first in the predefined order. The computer selects the ORB type.

The computer detects the first characteristic points P1 of the selected type in the first image i1, in this example of the ORB type.

The computer detects the second characteristic points P2 of the selected type in the second image i2, in this example of the ORB type.

According to the pairing step 101, the computer generates a plurality of pairs of characteristic points by matching a plurality of first characteristic points P1 with a plurality of second characteristic points P2 in the overlapping zone Z.

The matching involves associating vectors associated with the first characteristic points P1 and with the second characteristic points P2 in order to keep only the first characteristic points P1 and the second characteristic points P2 that are present in the first image i1 and in the second image i2, i.e., located in the overlapping zone Z.

The association is achieved, for example, by computing a distance between the vectors for all the possible combinations between the first characteristic points P1 and the second characteristic points P2. When the distance computed for a first characteristic point P1 and a second characteristic point P2 is less than a predetermined value, the computer determines a high probability of a match between said first characteristic point P1 of the first image i1 and said second characteristic point P2 of the second image i2 and generates a matching pair of characteristic points.

The computer computes a vector distance for all the possible combinations between the first characteristic points P1 and the second characteristic points P2. Since the first image i1 and the second image i2 include an overlapping zone Z, the computer can match a plurality of first characteristic points P1 with a plurality of second characteristic points P2 and can generate a plurality of pairs of characteristic points.

For example, the distance is a Hamming distance.

According to the optional validating step 102, the computer validates or invalidates said matching.

The matching is validated if the plurality of pairs of characteristic points includes a number of pairs that is greater than a first predetermined threshold and is associated with an induced palm surface S that is greater than a second predetermined threshold.

The induced surface S is defined in each first and second image by an enclosure of the whole zone comprising the plurality of first characteristic points and second characteristic points.

The induced surface S contains the plurality of first characteristic points and of second characteristic points in each first and second image.

Since the plurality of first characteristic points and the plurality of second characteristic points are associated in a plurality of pairs of characteristic points according to the matching, the induced surface S in the first image is the same as the surface S in the second image.

Advantageously, the first threshold is different depending on the type of characteristic points selected by the computer.

For example, for the ORB type descriptor, the first threshold ranges between fifty and two hundred, and typically equals one hundred.

For example, for the SIFT type descriptor, the first threshold ranges between one hundred and two hundred, and typically equals one hundred and fifty.

For example, for the minutia type descriptor, the first threshold ranges between twenty and fifty, and typically equals thirty.

Preferably, the second threshold is identical irrespective of the type of characteristic points selected by the computer.

For example, the second threshold ranges between 10,000 pixels and 30,000 pixels, and typically equals 20,000 pixels, which corresponds to the equivalent of a rectangle of 100 pixels by 200 pixels.

The equivalent rectangle is provided by way of an illustrative example, in order to provide a visual indication of what this represents, as the induced surface S is not necessarily rectangular.

For example, the shape of the enclosure corresponds to the shape of the whole comprising the plurality of first characteristic points or of second characteristic points. The shape then depends on the location of the pairs of characteristic points. The enclosure assumes any shape, and is not predetermined.

For example, the enclosure assumes a predetermined shape, for example, a rectangle or an oval. The enclosure is limited to the whole comprising the plurality of first characteristic points or of second characteristic points.

The matching is invalidated if the plurality of pairs of characteristic points includes a number of pairs that is less than or equal to the first predetermined threshold, or if the plurality of pairs of characteristic points is associated with an induced palm surface S that is less than or equal to a second predetermined threshold.

In the event of invalidated matching, the steps of detecting 100, pairing 101 and validating 102 are repeated with another predetermined type of characteristic points.

Preferably, the predetermined type associated with each iteration is a function of the aforementioned predefined order.

For example, the predefined order is:
the ORB type descriptor;
the SIFT type descriptor;
the minutia type descriptor.

For the first iteration of the detecting 100, pairing 101 and validating 102 steps, the type of characteristic points is the ORB type descriptor.

If, during the first iteration, the matching is invalidated, the type of characteristic points selected for the second iteration of the detecting 100, pairing 101 and validating 102 steps is the SIFT type descriptor.

If, during the second iteration, the matching is invalidated, the type of characteristic points selected for the third iteration of the detecting 100, pairing 101 and validating 102 steps is the minutia type descriptor.

Depending on the characteristics of the biometric print of the palm of the individual, the type of characteristic points most relevant for matching can vary. For this reason, the method of the invention proposes repeating the steps of detecting 100, pairing 101 and validating 102 for different types of characteristic points.

If, during the last iteration, in this case the third iteration, the matching is invalidated, then the overlapping zone Z may be too small, for example, because of poor positioning of the palm of the hand when acquiring one of the images from among the first image i1 or the second image i2, or because of poor quality of the first image i1 or of the second image i2, or if the palm of the individual is dry. In this case, the computer is not able to generate a palm image according to the method of the invention.

For example, the computer returns an error, by means of an audible or visual message.

When the matching is validated according to any one of the iterations of the detecting 100, pairing 101 and validating 102 steps, the method continues with the computing step 103.

If the method of the invention does not include the validating step 102, the computer implements the computing step 103 after the pairing step 101, without validating the matching.

According to the computing step 103, the computer computes an overall geometric transformation T12 associated with said matching.

In order to compute the overall geometric transformation T12, the computer selects a reference image from among the first image i1 and the second image i2 and determines the geometric transformation to be applied to all the pixels of the image that is not the reference image with respect to said reference image, so that the first image is superimposed on the second image in the overlapping zone Z, while minimizing an overall residual error.

For example, the computer determines a particular geometric transformation for each pair of characteristic points, with the overall geometric transformation being the particular geometric transformation that receives the most votes (i.e., with the highest occurrence) within the plurality of pairs of characteristic points.

According to another example, the overall geometric transformation is the average of the particular geometric transformations.

The computing step 103 comprises computing an overall linear transformation and an associated overall residual error.

For example, the overall linear transformation is determined by a breakdown into a singular value.

For example, the overall linear transformation is determined by a direct linear transform.

The computer computes an overall linear transformation associating, for the plurality of pairs of characteristic points, the plurality of characteristic points of the image other than the reference image with the plurality of characteristic points of the reference image.

For example, the reference image is the first image i1.

The computer computes the overall linear transformation associating the plurality of second characteristic points with the plurality of first characteristic points.

Based on the computed overall linear transformation, the computer determines the position of the transform of the plurality of second characteristic points by the overall linear transformation, relative to the position of the first characteristic points.

Then, the computer determines the overall residual error.

For example, the residual error corresponds to a distance between the position of the first characteristic points and the position of the transform of the second characteristic points by the overall linear transformation.

For example, the overall residual error includes an average of the distances for each pair of characteristic points between the position of the first characteristic point and the position of the transform of the second associated characteristic point, by the overall linear transformation.

The overall residual error is compared to a predetermined threshold error.

For example, the predetermined threshold error ranges between three and ten pixels, and typically equals five pixels.

For example, the residual error is a function of a diagonality of a transformation matrix associated with the overall linear transformation.

For example, the residual error is a function of a deformation factor from one end of the induced surface S to another end of the induced surface S.

For example, the residual error is a function of a number of votes associated with the particular geometric transformation that receives the most votes.

If the overall residual error is greater than the predetermined threshold error, the computer computes an overall non-linear transformation.

For example, the overall non-linear transformation is computed based on the previously computed overall linear transformation.

The computer determines a second overall residual error associated with the overall non-linear transformation, according to one of the methods described for the overall residual error associated with the overall linear transformation.

If the second overall residual error is greater than the predetermined threshold error, the computer returns an error, by means of an audible or visual message.

If the computer has computed an overall linear or non-linear geometric transformation, associated with an overall residual error or a second overall residual error below the predetermined threshold error, then the overall geometric transformation is validated.

Computing an overall geometric transformation is not sufficient to generate a good quality palm image because the first image and the second image are derived from two acquisitions corresponding to two distinct palm positions on a contact acquisition surface, with the individual having removed their palm from the acquisition surface between two positions.

Thus, the computer does not know a priori either the size or the exact position in the first and the second image of the overlapping zone Z, or the extent of the local deformations due to the contact pressure force applied by the individual on the acquisition surface.

As the skin of the palm is resilient, and the portion of the palm placed on the acquisition surface is different for each partial palm image acquisition, inhomogeneous local deformations exist between partial palm images. Local geometric transformations need to be determined.

According to the determining step 104, the computer determines a local geometric transformation t12a-t12n for each pair of points of the plurality of pairs of characteristic points, as illustrated in FIG. 2.

For a pair of points, the associated local geometric transformation t12a-t12n is determined so as to minimize a local residual error, for example, by solving systems of linear equations.

For example, the local geometric transformation is linear.

For example, the local geometric transformation is refined or projective.

For example, the local geometric transformation is non-linear.

For example, the geometric transformation is derived from a predetermined transformation model.

For example, the local residual error for a pair of characteristic points is determined by a distance between the position of the first characteristic point of the pair of points and the position of the transform of the second characteristic point of the pair of points, by the local geometric transformation.

According to the merging step 105, the computer merges the first image i1 with the second image i2 into a merged image i12, as a function of the overall geometric transformation T12 and of the local geometric transformations t12a-t12n.

The merged image i12 is acquired by superimposing the reference image, for example, the first image, and the transform of the image other than the reference image, for example, the second image, by the overall geometric transformation T12 and the local geometric transformations t12a-t12n.

The overall geometric transformation is applied to all the pixels of the image other than the reference image, in this case the second image i2.

A modification of the pixels according to a local geometric transformation t12a-t12n is also applied to the image other than the reference image, in this case the second image i2, in a region of predetermined size including the pair of points associated with said local geometric transformation t12a-t12n.

Preferably, a region is centred on the pair of points associated therewith.

For example, the predetermined size ranges between thirty and seventy pixels, typically fifty pixels.

Pixels belonging to several regions are modified in the image other than the reference image, according to an average of the local geometric transformations t12a-t12n associated with said regions.

The palm image generated by the method of the invention includes the merged image i12.

For example, the palm image is the merged image i12 derived from implementing the method of the invention, based on a first image and a second image.

Figure 3:
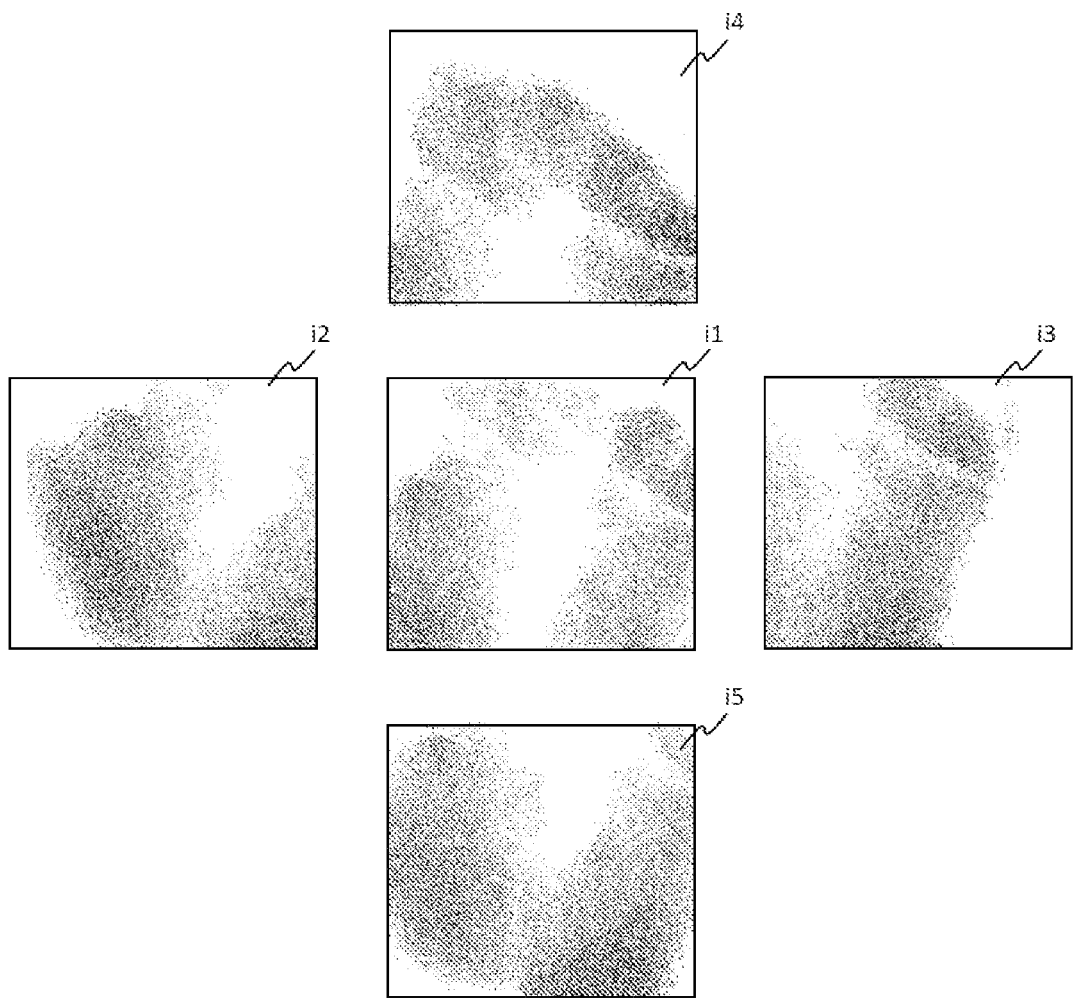
FIG. 3 illustrates an example of five partial images of a palm of a hand of a user.

For example, the computer also has at least one additional partial palm image i3, i4, i5, as illustrated in FIG. 3.

FIG. 3 illustrates five partial palm images of a left hand palm of an individual:
 a first image i1 of the centre of the palm, preferably acquired by pressing on the centre of the hand so that an image is captured of the hollow of the hand;
 a second image i2 of the left portion of the palm, including the thenar eminence;
 a third image i3 of the right portion of the palm, including the hypothenar eminence;
 a fourth image i4 of the upper portion of the palm, including the interdigital zone;
 a fifth image i5 of the lower portion of the palm, including the base of the wrist;
with the third, fourth and fifth images i3, i4, i5 being additional images within the meaning of the invention.

Advantageously, one from among the first image i1 or the second image i2 includes a partial palm image including the centre of the palm. Thus, all the additional partial palm images include a zone overlapping with the merged image i12 derived from the merger between the first image i1 or the second image i2

For example, as illustrated in FIG. 3, the first image i1 includes the centre of the palm of the individual.

The second image i2 includes a zone overlapping with the first image i1, with the overlapping zone including a centre portion of the palm.

The additional images i3, i4, i5 each include an overlapping zone including another centre portion of the palm.

In order to generate a palm image based on at least one additional image i3, i4, i5 in addition to the first and second images, the method comprises repeating the steps of detecting 100, pairing 101, validating 102, if present, computing 103, determining 104 and merging 105, with the merged image from the merging step 105 of the previous iteration as a first image, and an additional image i3, i4, i5 including another zone overlapping with said merged image as a second image, with the method being repeated for each additional image.

Figure 4:
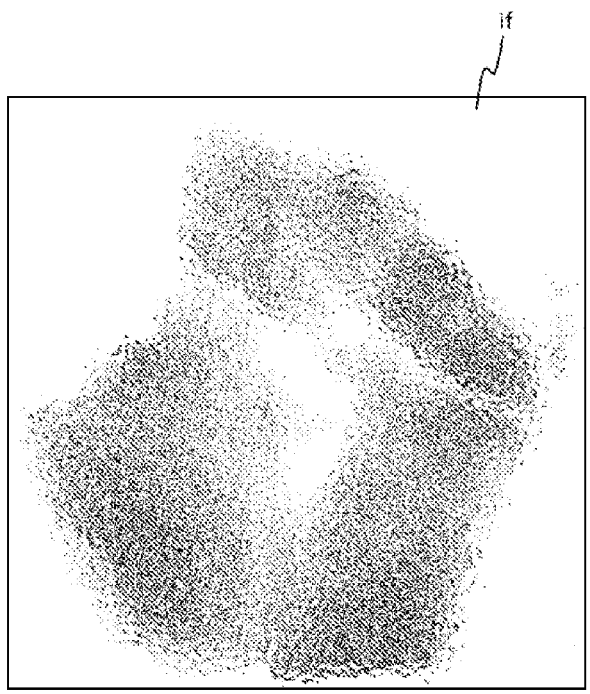
FIG. 4 illustrates a palm image generated according to the method of the invention based on the five images of FIG. 3.

The palm image if, as illustrated in FIG. 4, includes the merged image derived from the last iteration.

According to the example of FIGS. 3 and 4, the computer generates a first merged image i12 derived from a first iteration of the method of the invention based on the first image i1 of the centre of the palm and on the second image i2 of the left portion of the palm.

Then, according to a second iteration of the method of the invention, with the third image i3 of the right portion of the palm as an additional image, the computer generates a second merged image based on the first merged image i12 for the first image and based on the additional image for the second image.

Then, according to a third iteration of the method of the invention, with the fourth image i4 of the upper portion of the palm as an additional image, the computer generates a third merged image based on the second merged image for the first image and based on the additional image for the second image.

Finally, according to a fourth and last iteration of the method of the invention, with the fifth image i5 of the lower portion of the palm as an additional image, the computer generates a fourth merged image based on the third merged image for the first image and based on the additional image for the second image.

Since each additional image i3, i4, i5 includes a zone overlapping with the first image i1, and the first merged image is also generated based on the first image i1, each additional image i3, i4, i5 actually includes a zone overlapping with the merged image of the previous iteration.

The palm image if, as illustrated in FIG. 4, is the fourth merged image.

The palm image if is derived from the overall merging of the five partial palm images i1-i5, by successive mergers of partial palm images.

Repeating the method of the invention with an additional image allows these successive mergers of partial palm images, allowing an entire palm to be reconstructed, provided that said additional image includes a zone overlapping with the merged image of the previous iteration.

The invention also relates to a contact biometric print acquisition device comprising a computer capable of implementing the steps of the method of the invention.

For an acquisition device comprising a rectangular contact acquisition zone with dimensions including a long side ranging between 7.5 and 8.5 centimetres, and a short side ranging between 7 and 8 centimetres, it is recommended that five partial palm images i1-i5 are acquired, as described and illustrated with reference to FIG. 3, in order to generate an entire palm image if according to the method of the invention.

In order to guide an individual to correctly position their hand over the acquisition zone, the device can issue visual or audible positioning instructions.

The device also may be able to repeat a positioning instruction for a new partial palm image acquisition, if the positioning is not correct.

For example, a hand position is incorrect if the zone of a partial palm image overlapping with another partial palm image is insufficient.

The method of the invention also can be used to generate a palm image including the portion of the hand located in the extension of the little finger on the side of the hand, called "writer's palm", if the overlapping zone is sufficient (please refer to the validation criteria according to the validating step 102).

It should be noted that this method is applicable to fingerprints, for generating a finger image based on partial finger images.

Consequently, this method is applicable for generating an image of a complete hand including a palm and fingers, based on partial or entire images of the fingers and palm.

The method of the invention allows a palm or hand image to be generated, with a compact acquisition device with low computational power, in near real time and in the field, i.e., in any location where a requirement is expressed.

The invention claimed is:

1. A method for generating an image of a palm of an individual using a computer, based on a first partial image of a palm of the individual and on a second partial image of a palm of said individual comprising an overlapping zone overlapping with said first image, said method comprising:
   detecting first characteristic points of the palm in the first image and second characteristic points of the palm in the second image, for a predetermined type of characteristic points;
   generating a plurality of pairs of characteristic points by matching a plurality of first characteristic points with a plurality of second characteristic points in the overlapping zone;
   computing an overall geometric transformation associated with said matching;
   determining a local geometric transformation for each pair of points of the plurality of pairs of characteristic points; and
   merging the first image and the second image into a merged image, as a function of the overall geometric transformation and of the local geometric transformations, with the palm image comprising the merged image.

2. The generation method according to claim 1, wherein the predetermined type being selected from among a list including: an ORB type descriptor, a SIFT type descriptor, and a minutia type descriptor.

3. The generation method according to claim 1, further comprising validating or invalidating the matching, with the detecting, the pairing and the validating being repeated with another predetermined type of characteristic points if the matching of the previous iteration is invalidated.

4. The generation method according to claim 3, wherein the predetermined type associated with each iteration is a function of a pre-established order.

5. The generation method according to claim 3, wherein the matching is validated if the plurality of pairs of characteristic points includes a number of pairs that is greater than a first predetermined threshold and is associated with an induced palm surface that is greater than a second predetermined threshold.

6. The generation method according to claim 1, wherein the computing further includes computing an overall linear transformation and an associated overall residual error, with an overall non-linear transformation being computed if the overall residual error is greater than a predetermined threshold error.

7. The generation method according to claim 1, wherein
   a local geometric transformation is determined to minimize a local residual error for the associated pair of points according to the determining, and
   the merging comprising, for each pair of points, a modification of pixels of the first image or of the second image in a region of predetermined size comprising said pair of points, as a function of the local geometric transformation associated with said pair of points.

8. The generation method according to claim 7, wherein pixels belonging to several regions being modified according to an average of the local geometric transformations associated with said regions.

9. The generation method according to claim 1, further comprising, from at least one additional partial image of a palm, repeating the steps of detecting, pairing, computing, determining and merging, with the merged image from the preceding merging as the first image, and an additional image comprising another zone overlapping with said merged image as the second image, the method being repeated for each additional image, the palm image comprising the merged image derived from the last iteration.

10. A non-transitory computer readable program product including program instructions implementing the generation method according to claim 1, when the program instructions are executed by a computer.

11. A contact biometric print acquisition device comprising a computer having a processor generating an image of a palm of an individual using a computer, based on a first partial image of a palm of the individual and on a second partial image of a palm of said individual comprising an overlapping zone overlapping with said first image, the processor being configured to:

- detect first characteristic points of the palm in the first image and second characteristic points of the palm in the second image, for a predetermined type of characteristic points,
- generate a plurality of pairs of characteristic points by matching a plurality of first characteristic points with a plurality of second characteristic points in the overlapping zone;
- compute an overall geometric transformation associated with said matching,
- determine a local geometric transformation for each pair of points of the plurality of pairs of characteristic points, and
- merge the first image and the second image into a merged image, as a function of the overall geometric transformation and of the local geometric transformations, with the palm image comprising the merged image.

* * * * *